April 8, 1969 S. N. SMALL 3,436,972
DRIVE DEVICE INCORPORATING A TOOTHLESS RACK
Filed Feb. 13, 1967
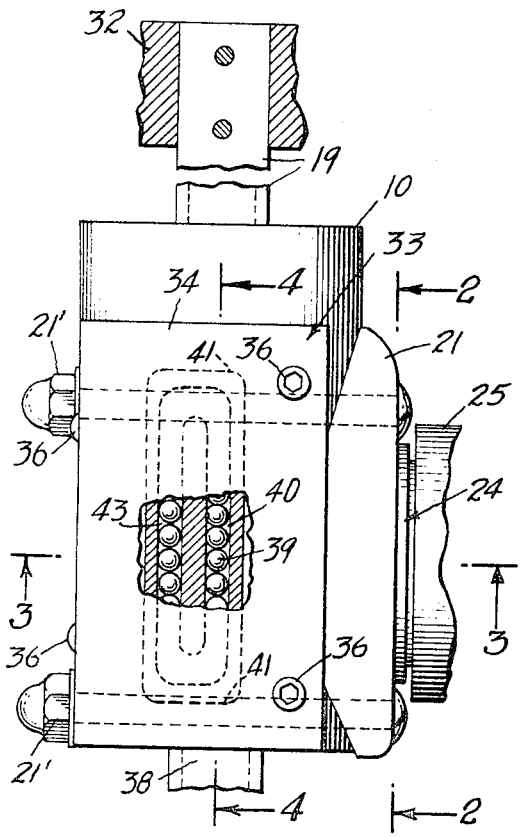
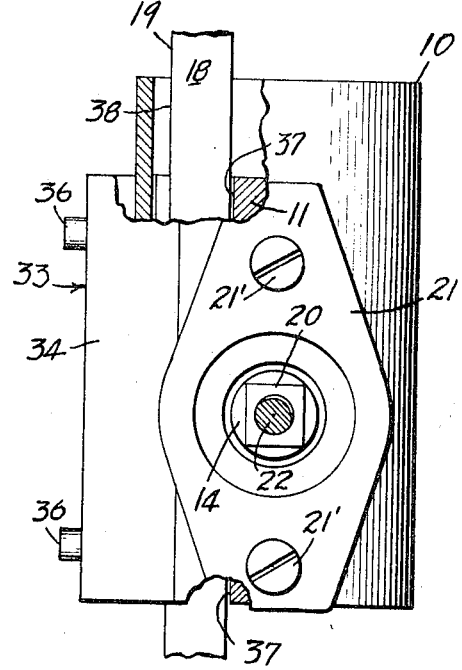
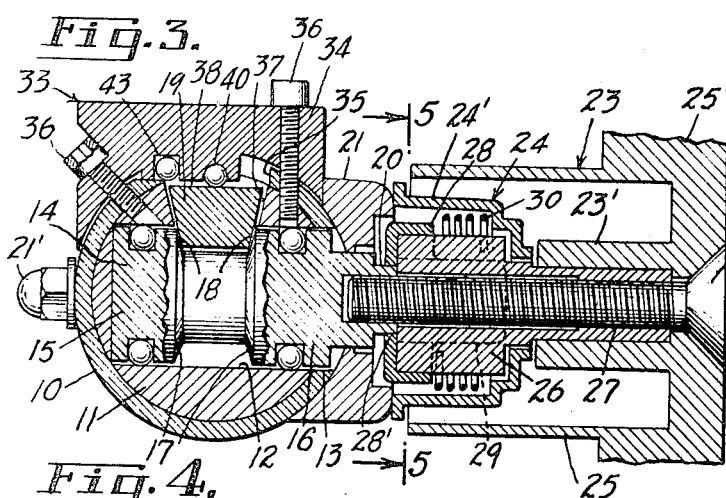
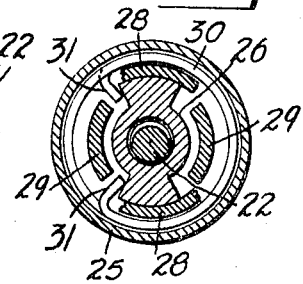
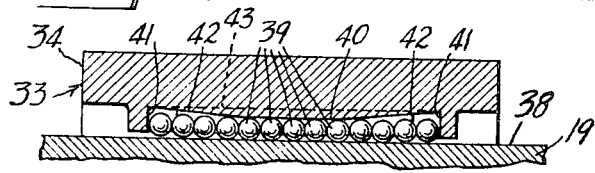
INVENTOR.
SAMUEL N. SMALL
BY
Howard T. Thompson
ATTORNEY

United States Patent Office 3,436,972
Patented Apr. 8, 1969

3,436,972
DRIVE DEVICE INCORPORATING
A TOOTHLESS RACK
Samuel N. Small, Valley Stream, N.Y., assignor to Alfred
G. Cohen, and Paul Weiss, Flushing, N.Y.
Filed Feb. 13, 1967, Ser. No. 615,590
Int. Cl. F16h 29/02
U.S. Cl. 74—89                                               8 Claims

ABSTRACT OF THE DISCLOSURE

A friction rack and pinion is driven by an alternately rotating drive member keyed to the pinion shaft. The driving member includes a coil-spring clutch. The rack is held in friction engagement with the pinion by means of a housing containing recirculating ball bearings which bear upon the rack.

BACKGROUND OF THE INVENTION

The invention deals generally with what are known as racks which are reciprocated by suitable drive means in imparting back and forth movement to a member coupled with the rack. The present invention deals specifically with the substitution of a toothless rack in the form of an elongated bevelled surface element supplementing the conventional gear rack in movement of a member back and forth in the feed or operation thereof and, wherein, said element is held in pressure engagement with the driving means employed through antifrictional means, such, for example, as bearing balls.

While many devices and apparatus have incorporated conventional gear rack structures, to applicant's knowledge, it is distinctly new to supplement for the toothlike rack a plain surface or toothless rack and a suitable drive therefor and, to his knowledge, there is no prior art anticipating this structural combination.

SUMMARY OF THE INVENTION

Drive devices of the type and kind under consideration incorporating toothless racks will be simple and economical in construction and fulfill much needed wants in devices, machines and apparatus of various kinds and descriptions, the device adapting itself for the use of various types of manual and power drive means for imparting the reciprocating drive to the toothless rack or an elongated plain and bevelled surface element.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a face view of a device made according to my invention, with parts of the construction broken away and shown in section.

FIG. 2 is a side view, generally taken along the lines 2—2 of FIG. 1, and omitting portions of the drive which otherwise would appear in section and parts of the construction being broken away and in section.

FIG. 3 is a section, generally along the lines 3—3 of FIG. 1, with parts shown in elevation and with parts broken away and illustrating diagrammatically areas of the assemblage where pressure screws are located beyond the area of the drive rod employed.

FIG. 4 is a diagrammatic section on the line 4—4 of FIG. 1 to clearly illustrate the contour of a wall of a bearing ball track, with the arrangement of the balls therein and showing part of the reciprocated element in section; and FIG. 5 is a diagrammatic section, generally on the line 5—5 of FIG. 3, breaking away a portion of the clutch sleeve to show the reduced side arms of said sleeve in section and omitting background showing.

In illustrating one adaptation and use of the invention, I have shown in the accompanying drawing support means, comprising a tubular casing 10, in which is arranged a cylindrical body 11, having a transverse bore 12 therein, which registers with an aperture 13 on one side of the casing, as clearly seen in FIG. 3. The drive means of the device comprises a rotatable drive rod 14, having enlarged spaced antifrictional bearing portions 15 and 16 operating in the bore 12. Adjacent surfaces of bearing portions 15 and 16 have bevelled driving surfaces 17 operatively engaging bevelled sides 18 of an elongated reciprocating element 19. Note FIG. 3.

The bearing portions 15 and 16 are grooved to receive the bearing balls of these portions, as clearly illustrated in FIG. 3.

The rod 14 has an end protruding through the aperture 13 and terminating in a rectangular or key end 20, as clearly illustrated in FIG. 2. Secured to the casing and enveloping the rod end is a bracket 21, generally of the contour seen in FIGS. 1 and 2 and in section in FIG. 3. The end of the rod 14 has a threaded bore to receive a coupling screw 22 for mounting an alternating rotary drive means, generally identified by the reference character 23 in FIG. 3 and a conventional two-way drive clutch assesmbly 24, in connection with the casing 10. The drive means 23 can be of any type and kind for imparting an alternating rotary motion to the drive rod 14. The drive means 23 includes a tubular casing 25 housing the clutch assembly 24. At 25', FIG. 3, is shown broken away means on the drive means, which can comprise any type of manual or power drive imparting alternating rotation to 23 and, thus, to the rod 14 through the clutch assembly 24.

For clarity and understanding the drive, the clutch assembly includes a fantail clutch 26, note FIG. 5, including a tubular portion 27 in threaded engagement with the screw 22, as clearly noted in FIG. 3. The assemblage also includes a clutch sleeve 28 having reduced diameter side arms 29 at its inner end, note FIG. 5, which operate in connection with the fantail clutch 26, as will be apparent. Clutches of this type and kind employ coil springs 30, having ends 31 which operatively engage the fantail clutch 26, as clearly illustrated in FIG. 5, thus providing for the two distinct alternating rotary motion drives of the drive rod 14. The clutch sleeve 28 is keyed to the key end 20, as seen at 28' in FIG. 3, thus coupling the clutch assembly directly with the drive rod 14.

The clutch assemblage 24 includes a cup-shaped casing 24', which is positioned between a hub portion 23' of the drive means 23 and the surface of the bracket 21. The bore of the hub portion 23' is square or other key cross-sectional contour engaging the correspondingly formed periphery of the tubular portion 27, thus, definitely keying the drive means 23 to the clutch 26. The screw 22 retains the drive means 23, clutch 26 and rod 14 in coupled relationship. The bracket 21 is secured to the casing 10 and the body 11 by bolts, as seen at 21' in FIGS. 1 and 2 of the drawing. It will further appear, from a consideration of FIGS. 2 and 3, that the bracket is apertured and recessed to receive the drive rod 14, as well as part of the clutch assembly 24.

Fixed to one end of the reciprocated element 19 is a member 32 of any type or kind, part of this member being illustrated in section at the top of FIG. 1. This member will be moved back and forth in actuation of the element 19 a predetermined distance through the particular drive means 23 employed. In some instances, this drive means may be a manually operated crank or a drive means of any other type and kind imparting the rotary alternating motion to the drive rod 14 in imparting the desired movement to the element 19.

At 33 is shown a pressure unit for applying pressure on the element 19 in pressure support of the bevelled surfaces 18 thereof in engagement with the bevelled ends 17 of the bearing portions 15 and 16. In the present drawing, this unit comprises an elongated block 34 of the cross-sectional form shown in FIG. 3 to fit over the casing 10 and supported thereon and on the body 11 at a position to register with an aperture 35 in the casing 10 by screws 36, four of which are employed, as illustrated in FIG. 1 and, in part, in FIG. 3.

The body 11 has, on its upper surface, as seen in FIG. 3, an elongated aperture, which registers with the aperture 35 in the casing and opens through ends of said body, as designated clearly by the reference characters 37 in FIG. 2 of the drawing, this aperture being shown in section in FIG. 3. The aperture 37 generally conforms to the contour of the element 19, but the element is freely movable in said aperture. The clearances shown are exaggerated in FIG. 3, as well as in FIG. 2 in order that the pressure engagement of the element 19 with the bevelled surfaces 17 will appear.

The block 34 is adjustably supported on the casing 10 by the screws 36 in pressure supporting a line of antifrictional means in engagement with a surface 38 of the element 19, as seen by the five bearing balls 39 operating on the flat surface 40 defining the lower track. Note FIGS. 3 and 4.

The lower track has ends 41, between which and 40 are bevels 42, FIG. 4, to provide freedom of movement of the bearing balls into rounded ends of the elliptical track, as illustrated by the dotted line showing in FIG. 1, to direct these bearing balls into the higher track 43, note FIG. 3, so that, in both reciprocating motions of the element 19, the bearing balls will automatically feed over the flat surface 40 and into end portions of the elliptical track in movement of these bearing balls from the low track into the high track and vice versa. The two tracks are formed upon the inner concaved surface of the block 34, as will be clearly apparent from a consideration of FIGS. 3 and 4, taken with the showing in FIG. 1 of the drawing. It will appear, from a consideration of FIG. 4, that the flat surface 40 parallels the surface 38 of the element 19.

In initial assembly of the parts of the device, the drive rod is inserted into the bore 12 and the balls of the bearing portions 15 and 16 are assembled by first positioning the balls in the bearing portion 15 when 15 is at least in partial registration with the apertures 35 and 36 and, by then moving the drive rod inwardly to a slight extent, the balls are placed in the bearing portion 16 at a point adjacent the aperture 13 of the casing 10, after which, the drive rod 14 is moved inwardly into the position shown in FIG. 3 of the drawing. In this connection, it will also be apparent that, in assembling the block 34 of the pressure unit, the bearing balls 39 will be mounted in the elliptical track, with the track exposed inwardly; whereupon, the casing 10 will be placed upon the block 34, with the element 19 positioned in the casing 10 and body 11 and, then, the screws will be coupled for support of the pressure unit 33 on the casing. The rest of the assemblage will be apparent to one skilled in the art.

In various uses of the device, the drive movement can be directly primarily to either the rod or the element. In other words, instead of driving the rod to reciprocate the element, the element can be driven to impart rotary alternating movement to the rod or means coupled with the rod.

With various types and kinds of devices, the support means, such, for example, as the casing 10 can be of any desired structure and changes in this structure would, of necessity, modify the other component parts attached to the support means and, here again, consistent with the particular type of drive means employed. With the diagrammatic showing in the accompanying drawing, the device can be utilized in imparting reciprocating movement to a member 32 longitudinally with respect to an elongated tube, of which the casing 10 would constitute a part.

Having fully described my invention, what I claim as new and desire to secure by Letters Patent is:

1. A drive device comprising a body, support means for said body, a rotatable rod mounted for alternating rotary movement in said body, said rod having an exposed key end, an elongated element mounted for reciprocating movement in said body in a guided path, a pressure unit supporting a plurality of recirculating spherical antifriction members, substantially all of which longitudinally operatively engage said element, means controlling pressure engagement of the antifriction members with said element, means establishing frictional engagement with said body, and drive means for imparting relative movement to said rod and element.

2. A device as defined in claim 1, wherein the antifriction members of said unit comprises a plurality of bearing balls operating in an elliptical track having high and low track portions.

3. A device as defined in claim 2, wherein said low track portion includes a long flat bearing portion paralleling a surface of said element.

4. A drive as defined in claim 1, wherein said body and the support means therefor have alined apertures, through which one end portion of the rod is exposed, and said last named means including means establishing coupling engagement with the exposed key end of said rod.

5. A device as defined in claim 4, wherein said rod includes spaced antifriction bearing portions operating in said body, and said third named means comprising bevelled surfaces on said bearing portions operatively engaging bevelled sides of said element.

6. A device as defined in claim 5, wherein the means establishing coupling engagement with said rod comprises a two-way clutch.

7. A device as defined in claim 1, wherein said third named means comprises spaced annular bevelled surfaces on said rod engaging bevelled side surfaces of said element.

8. A device as defined in claim 7, wherein the spaced annular bevelled surfaces of said rod define adjacent surfaces of spaced antifriction bearing portions of said rod.

References Cited

UNITED STATES PATENTS

| | | | |
|---|---|---|---|
| 2,210,948 | 8/1940 | Oakley | 74—76 |
| 2,274,950 | 3/1942 | Croft et al. | 74—78 |
| 2,275,698 | 3/1942 | Strauss et al. | 74—78 |

FRED C. MATTERN, Jr., *Primary Examiner.*

F. D. SHOEMAKER, *Assistant Examiner.*

U.S. Cl. X.R.
74—206